US012306821B2

(12) United States Patent
Bush

(10) Patent No.: US 12,306,821 B2
(45) Date of Patent: May 20, 2025

(54) SYSTEM AND TECHNIQUES FOR TRAVERSING A DEPENDENCY GRAPH OR TREE STRUCTURE IN ONE STEP

(71) Applicant: Oracle International Corporation, Redwood Shores, CA (US)

(72) Inventor: Aaron Matthew Bush, Nixa, MO (US)

(73) Assignee: Oracle International Corporation, Redwood Shores (CA)

(*) Notice: Subject to any disclaimer, the term of this patent is extended or adjusted under 35 U.S.C. 154(b) by 23 days.

(21) Appl. No.: 18/130,419

(22) Filed: Apr. 3, 2023

(65) Prior Publication Data

US 2024/0330266 A1 Oct. 3, 2024

(51) Int. Cl.
*G06F 16/23* (2019.01)
*G06F 16/2457* (2019.01)

(52) U.S. Cl.
CPC .... *G06F 16/2358* (2019.01); *G06F 16/24573* (2019.01)

(58) Field of Classification Search
CPC .............. G06F 16/2358; G06F 16/24573
See application file for complete search history.

(56) References Cited

U.S. PATENT DOCUMENTS

| 9,860,168 | B1* | 1/2018 | Seshadri | H04L 69/22 |
|---|---|---|---|---|
| 11,314,779 | B1* | 4/2022 | Jain | G06F 1/12 |
| 2006/0116859 | A1* | 6/2006 | Legault | G06F 16/248 |
| | | | | 703/22 |
| 2015/0022528 | A1* | 1/2015 | Tojo | G06F 8/75 |
| | | | | 345/440 |
| 2020/0126321 | A1* | 4/2020 | Swearingen | G07C 5/085 |
| 2022/0129346 | A1* | 4/2022 | Wang | G06F 11/1471 |
| 2022/0269380 | A1* | 8/2022 | Tertzakian | G06F 16/248 |

* cited by examiner

*Primary Examiner* — Allen S Lin
(74) *Attorney, Agent, or Firm* — Kilpatrick Townsend & Stockton LLP

(57) ABSTRACT

In some aspects, techniques can be performed by a processor of a computing device, the method can include receiving an input selecting a first node instance of a first node. The method can include accessing a node dependency table listing one or more parent nodes and child nodes for the selected first node instance. The method can include determining if dependencies for the selected first node instance are met by accessing a node process log. The technique can include running the first node when the dependencies for the selected first node are met. The technique can include updating the node process log.

20 Claims, 8 Drawing Sheets

| Node (302) | Node_Instance (304) | Process_Flag (306) | Run_Start (308) | Run_End (310) |
|---|---|---|---|---|
| Ambulatory_Extract | A_E 10.01.2022 | Waiting | Null | Null |
| Ambulatory_Load | A_L dd.mo.yr | Waiting | Null | Null |
| Ambulatory_Transform | A_T dd.mo.yr | Waiting | Null | Null |
| Claims_Extract | C_E 10.01.2022 | Running | 23:01:01 09-Jan-2022 | Null |
| Claims_Load | C_L dd.mo.yr | Queued | Null | Null |
| Claims_Transform | C_T dd.mo.yr | Queued | Null | Null |
| Encounter_Extract | E_E 10.01.2022 | Finished | 08:25:10 9-Jan-2022 | 08:30:24 9-Jan-2022 |
| Encounter_Load | E_L dd.mo.yr | Queued | Null | Null |
| Encounter_Transform | E_T dd.mo.yr | Queued | Null | Null |
| Orders_Extract | O_E 10.01.2022 | Finished | 09:15:17 9-Jan-2022 | 09:35:22 9-Jan-2022 |
| Orders_Load | O_L 10.01.2022 | Finished | 09:35:23 9-Jan-2022 | 09:40:49 9-Jan-2022 |
| Orders_Transform | O_T 10.01.2022 | Finished | 09:50:51 9-Jan-2022 | 10:23:17 9-Jan-2022 |

SYSTEM AND TECHNIQUES FOR TRAVERSING A DEPENDENCY GRAPH OR TREE STRUCTURE IN ONE STEP

FIELD OF THE INVENTION

The present disclosure relates generally to monitoring and tracking of processes having multiple dependent requirements.

BACKGROUND

Traditionally there have been multiple ways to traverse a graph or tree structure for performing a process. The graph or tree structure can identify all parent-child relationships, but methodologies that use a graph or tree structure to identify various relationships can be complex, require multiple steps, and can be execution intensive. These graph or tree structures have been used across many different implementations to document relationships but are also used to show dependencies of parent actions necessary to be completed prior to a child action being started.

Current logic methodologies include multiple ways to traverse a graph or tree structure. Some of the more common examples of these traversal methods are depth-first search (DFS) (e.g., in-order, pre-order, post-order) and breadth-first search (BFS) (e.g., level-order). Common features of these methodologies are that they contain several implementation steps, recursively traverse the tree (which can get process and time intensive for a decent sized graph or tree structure), have stacks or queues to traverse, can be repetitive and visit a single node more than one time, etc. These methodologies can be complex and process intensive on large, complex dependency structures given their recursive and sometimes repetitive natures that require increasingly more time and resources as they grow more complex and larger.

The current methodologies may work for smaller, simple dependency graph or tree structures. Although they are still complex to design and write, the logic is well known and proven out. For these smaller, simpler structures, the recursive and sometimes repetitive natures do not affect processing as it is quick to traverse these. However, as these dependency structures grow and become more complex when taken out of academia and utilized in real-world settings, the processing required to validate if a child node has met all of its dependencies can be a large, resource and time intensive task.

BRIEF SUMMARY

This disclosure describes a new methodology that allows a system to traverse any tree structure or Directed Acyclic graph structure, in a single, simple process, without recursion, repetitiveness, stacks or queues that is not execution intensive regardless of the complexities of the underlying structure. This takes the most complex dependency structure, and simply and quickly validates if a child node has met all of its dependencies or not.

This drastically simplifies the code needed to traverse a dependency graph or tree Structure, taking the logic from potentially hundreds or thousands of lines of code to just one logical process step. Doing so makes implementing code for this much faster, less error prone, and of higher quality, as all areas can now follow a single, proven method with a single process step. This methodology is not execution intensive regardless of the complexities or size of the underlying Directed Acyclic graph or tree structure. This methodology takes the most complex dependency structure, and simply and quickly validates if a child node has met all of its parent node dependencies or not. This invention can reap enormous time and resource savings as compared to current methodologies in use today. In fact, the larger and more complex the dependency structure, the more time and resources savings are accrued, due to the recursive and repetitive nature of current methodologies. This is due to the fact that current methodologies expand usage of time and resources very quickly for these cases and resources required to traverse these structures can grow much faster than the corresponding linear growth of the structure itself.

Whereas using this invention the time and resources required to traverse these structures will have the same linear growth as the corresponding linear growth of the structure itself. This methodology is backwards compatible and can reuse current documentation of dependency structures in use today, making it simple to refactor into existing code bases (as well as for new processes).

In various aspects, techniques performed by one or more processors of a computing device, can including receiving an input selecting a first node instance comprising one or more scripts. The techniques can include accessing a node dependency table listing one or more parent nodes and child nodes for the selected first node instance. The techniques can include determining if dependencies for the selected first node instance are met by accessing a node process log. The techniques can include executing the one or more scripts of the first node instance when the dependencies for the selected first node instance are met. The techniques can include updating the node process log based on the executing the one or more scripts to indicate that the one or more scripts were executed.

In various embodiments, the determining if dependencies for the selected first node instance are met by accessing a node process log can include accessing the node dependency table to determine a last successful execution for selected node instance. The techniques can include determining all parent nodes associated with a selected child node from the input and dependency metadata. The techniques can include determining the earlier of all previously selected parent node's latest instance execution time in the dependency metadata and a previous node time stored in the node process log. When the previously selected parent node instance execution time is greater than or equal to the last successful run time for the selected node instance, the techniques can include indicating that all the dependencies have passed. When the previously selected parent node instance execution time is less than the last successful execution time for the selected node instance, the techniques can include indicating that one or more of the dependencies have failed.

In various embodiments, techniques can include storing metadata for each instance in which one or more nodes are processed to a log file.

In various embodiments, the metadata comprises one or more of a name of the node, a way to identify execution of the node, a status indicator for the node, a start time stamp, and an end time stamp.

In various embodiments, the techniques can include accessing dependency file to determine dependency structure. The techniques can include storing dependency list having a child node field and a parent node field.

In various embodiments, each child node in a dependency list can be stored as a single record. In various embodiments, a dependency list can be stored as a single record per distinct child node and parent node combination.

In various aspects, a system can include one or more processors; and a memory coupled to the one or more processors, the memory storing a plurality of instructions executable by the one or more processors, the plurality of instructions that when executed by the one or more processors perform operations. The operations can include receiving an input selecting a first node instance comprising one or more scripts. The operations can include accessing a node dependency table listing one or more parent nodes and child nodes for the selected first node instance. The operations can include determining if dependencies for the selected first node instance are met by accessing a node process log. The operations can include executing the one or more scripts of the first node instance when the dependencies for the selected first node instance are met. The operations can include updating the node process log based on the executing the one or more scripts to indicate that the one or more scripts were executed.

In various embodiments, the determining if dependencies for the selected first node instance are met by accessing a node process log can include dependency operations including accessing the node dependency table to determine a last successful run for selected node instance. The dependency operations can include determining parent nodes associated with a selected child node from the input and dependency metadata. The dependency operations can include determining the earlier of all previously selected parent node's latest instance execution time in the dependency metadata and a previous node time stored in the node process log. When the previously selected parent node instance run time is greater than or equal to the last successful run time for the selected node instance, the dependency operations can include indicating that all the dependencies have passed. When the previously selected parent node instance run time is less than the last successful run time for the selected node instance, the dependency operations can include indicating that one or more of the dependencies have failed.

In various embodiments, the operations can include storing metadata for each instance in which one or more nodes are processed to a log file. The metadata can include one or more of a name of the node, a way to identify execution of the node, a status indicator for the node, a start time stamp, and an end time stamp.

In various embodiments, the operations can include accessing dependency file to determine dependency structure. The operations can include storing dependency list having a child node field and a parent node field. In various embodiments, each child node a dependency list can be stored as a single record. In various embodiments, a dependency list can be stored as a single record per distinct child node and parent node combination.

In an aspect, a non-transitory computer-readable medium storing a plurality of instructions executable by one or more processors that cause the one or more processors to perform operations. The operations can include receiving an input selecting a first node instance comprising one or more scripts. The operations can include accessing a node dependency table listing one or more parent nodes and child nodes for the selected first node instance. The operations can include determining if dependencies for the selected first node instance are met by accessing a node process log. The operations can include executing the one or more scripts of the first node instance when the dependencies for the selected first node instance are met. The operations can include updating the node process log based on the executing the one or more scripts to indicate that the one or more scripts were executed.

In various embodiments, the determining if dependencies for the selected first node instance are met by accessing a node process log cab include dependency operations. The dependency operations can include accessing the node dependency table to determine a last successful execution for selected node instance. The dependency operations can include determining all parent nodes associated with a selected child node from the input and dependency metadata. The dependency operations can include determining the earlier of all previously selected parent node's latest instance execution time in the dependency metadata and a previous node time stored in the node process log. When the previously selected parent node instance execution time is greater than or equal to the last successful run time for the selected node instance, the dependency operations can include indicating that all the dependencies have passed. When the previously selected parent node instance execution time is less than the last successful execution time for the selected node instance, the dependency operations can include indicating that one or more of the dependencies have failed.

In various embodiments, the operations can further include storing metadata for each instance in which one or more nodes are processed to a log file.

In various embodiments, the metadata comprises one or more of a name of the node, a way to identify execution of the node, a status indicator for the node, a start time stamp, and an end time stamp.

In various embodiments, the operations can include accessing dependency file to determine dependency structure. The operations can include storing dependency list having a child node field and a parent node field. In various embodiments, each child node a dependency list is stored as a single record.

In various aspects, a system is provided that includes one or more data processors and a non-transitory computer readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 3 is an exemplary data table according to certain aspects.

DETAILED DESCRIPTION

In the following description, for the purposes of explanation, specific details are set forth in order to provide a thorough understanding of certain aspects. However, it will be apparent that various aspects may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other aspects or designs.

This disclosure described a new methodology that allows a system to traverse any dependency tree structure or directed acyclic graph structure in a single, simple implementation process without recursion, repetitiveness, stacks, or queues. This technique can drastically simplify the code needed to traverse a dependency graph or tree Structure, taking the logic from potentially hundreds or thousands of lines of code to just one logical process step. These techniques makes implementing code for this much faster, less error prone, and of higher quality, as all areas can now follow a single, proven method with a single process step. This methodology is not execution intensive regardless of the complexities or size of the underlying Directed Acyclic graph or tree structure. This methodology takes the most complex dependency structure, and simply and quickly validates if a child node has met all of its parent node dependencies or not. This invention can reap enormous time and resource savings as compared to current methodologies in use today.

The larger and more complex the dependency structure, the more time and resources savings are accrued, due to the recursive and repetitive nature of current methodologies. This is due to the fact that current methodologies expand usage of time and resources very quickly for these cases and resources required to traverse these structures can grow much faster than the corresponding linear growth of the structure itself. Whereas using this invention the time and resources required to traverse these structures will have the same linear growth as the corresponding linear growth of the structure itself. This methodology is backwards compatible and can reuse current documentation of dependency structures in use today, making it simple to refactor into existing code bases (as well as for new processes).

Figure 1:
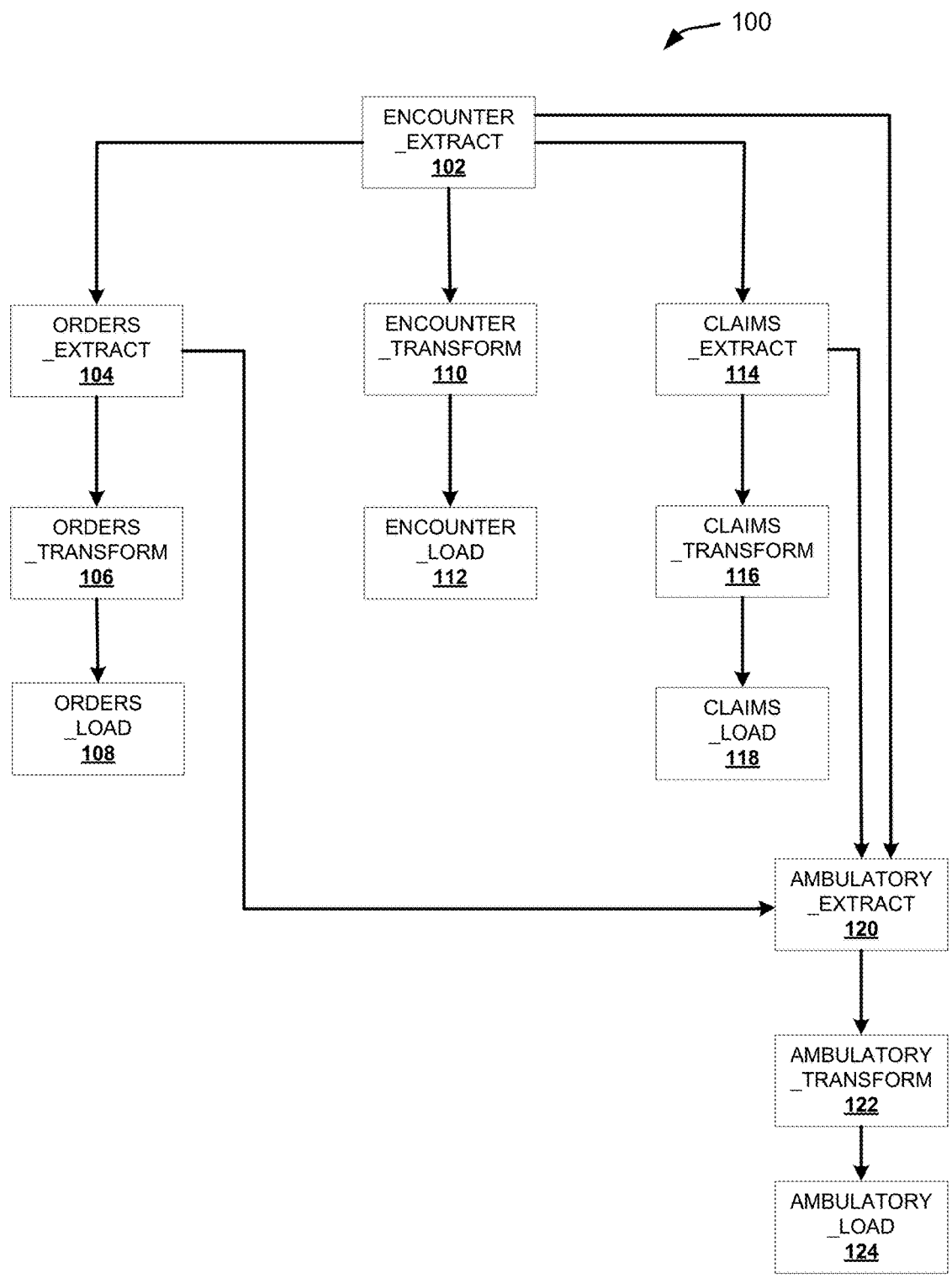
FIG. 1 is a simplified block diagram of an exemplary dependency tree structure according to certain aspects.

FIG. 1 is a simplified block diagram of an exemplary dependency tree structure 100 according to certain aspects. A dependency tree structure 100 can illustrate a series of subprocesses that are required to be completed prior to the execution of a different subprocess. The dependency tree structure 100 can indicate child (process) and parent (subprocess) in a way to show flow through the subprocesses. In one non-limiting example an ambulatory_extract 120 process can require that server subprocesses are completed prior to execution of the ambulatory_extract 120 process. The lines on the chart indicate the requirements for a process to be executed. For example, the ambulatory_extract 120 process requires the orders_extract 104, encounter_extract 102 and claims_extract 114 process to be completed prior to executing the ambulatory_extract 120 process. As another example the encounter_transform 110 process would not need to be complete prior to executing the ambulatory_extract 120 process. As another example, to execute the orders_extract 104 process only the encounter_extract 102 process needs to be completed prior to executing the orders_extract 104 process. In a non-healthcare example, if a process is to calculate a profit for a bank having several branches, the subprocesses can include calculating the profit for each of the branches can be done prior to calculating the profits for the bank as a whole.

The dependency tree structure 100 lists several processes with associated subprocesses that need to completed in order for the process to be executed. These processes and subprocesses form a parent-child relationship. The exemplary tree structure lists numerous encounter_extract 102, orders_extract 104, orders_transform 106, orders_load 108, encounter_transform 110, encounter_load 112, claims_extract 114, claims_transform 116, claims_load 118, ambulatory_extract 120, ambulatory_transform 122, ambulatory load 124 subprocesses. The dependency tree structure 100 illustrates dependencies between the various subprocesses. For example, in order for the ambulatory_extract 120 subprocess to be executed the orders_extract 104, encounter_extract 102, and claims_extract 114 subprocesses must have been previously been completed.

These structures have been used across many different implementations to document relationships but show all dependencies of parent actions necessary to be completed prior to a child action being started. This process can be used to ensure that no child is run before its parent dependencies are met, which could cause negative effects to the overall process.

The dependency tree structure 100 is merely exemplary and other implementations can be much more complex. Further, a dependency tree structure 100 is not limited to use in health care or health care management field.

Figure 2:
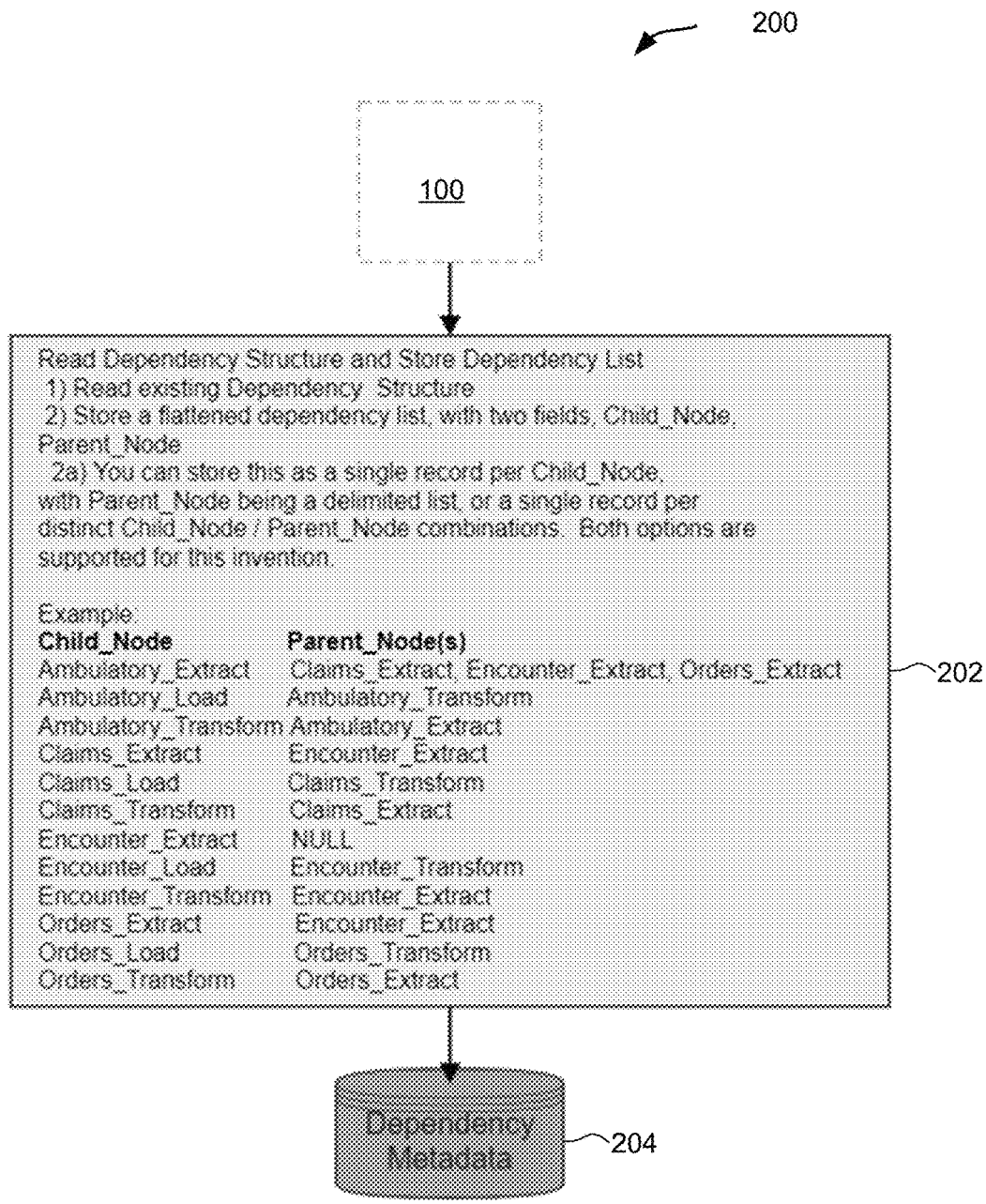
FIG. 2 is an exemplary dependency list according to certain aspects.

FIG. 2 is an exemplary dependency list 200 according to certain aspects. The dependency list 200 can list out the subprocesses from parent node that need to be completed prior to execution of the child nodes.

In an aspect, a process can access an existing dependency structure that can be stored in a memory. In the simplest form, the process can store a flattened dependency list 200 with at least two fields (e.g., a child_node and parent node). The dependency list 200 can be stored as a single record per child_node with the parent_node being a delimited list. Alternatively, the dependency list 200 can be stored as a single record per distinct child_node/parent node combinations.

In various embodiments the dependency tree structure 100 can already be stored as a compatible structure from which the dependencies can be determined. This process can be a one-time process unless it is desirable to keep the current dependency documentation as the source of truth, in which case it needs to be executed as often as the source of truth is modified. This process can be created uniquely for a new process, or an existing process' documented structure can be parsed to create.

This process allows porting of any current, incompatible documentation method into a new compatible methodology. The example provided in FIG. 2 illustrates a simple, single key used for all nodes. The composite keys can be used as needed for uniqueness for more complex examples.

FIG. 2 illustrates a child_node listing 202 that lists the child nodes illustrated from the dependency tree 100 of FIG. 1. FIG. 2 also illustrates a parent_node listing 204 that lists the parent nodes illustrates from the dependency tree 100 of FIG. 1. For example, the ambulatory_extract 120 node requires that the parent nodes claims_extract 114, encounter_extract 102, and orders_extract 104 subprocesses must be completed prior to executing the ambulatory_extract 120 process. In another example, the encounter_extract 102 node has no parent and thus is listed as "null." This means that no subprocess needs to be completed prior to executing the encounter_extract 102 subprocess. In another example, the encounter_load 112 requires completion of the encounter_transform 110 subprocess prior to executing the encounter_load 112 subprocess.

The dependency tree 100 of FIG. 1 can be converted into a "dependency metadata" structure to allow for easily identification of all parent nodes and child nodes. The dependency listing 200 can be stored in a dependency metadata server 204.

FIG. 3 is an exemplary data table 300 according to certain aspects. For each instance in which a node is processed, the metadata associated with the node instance can be written to a log file or table. This metadata can be expanded to fit unique process implementation needs but should contain the following records at a minimum.

The data field can include the name of the process for the node (node 302), the way to uniquely identify a given run, such as date queued, client etc. (node_instance 304), the current state of a node_instance (e.g., queued, running, finished, failed, waiting, etc.) (process flag 306), a date stamp of when the node_instance is started run_start 308, and a date stamp of when the node_instance has finished (e.g., run_end 310).

Figure 4:
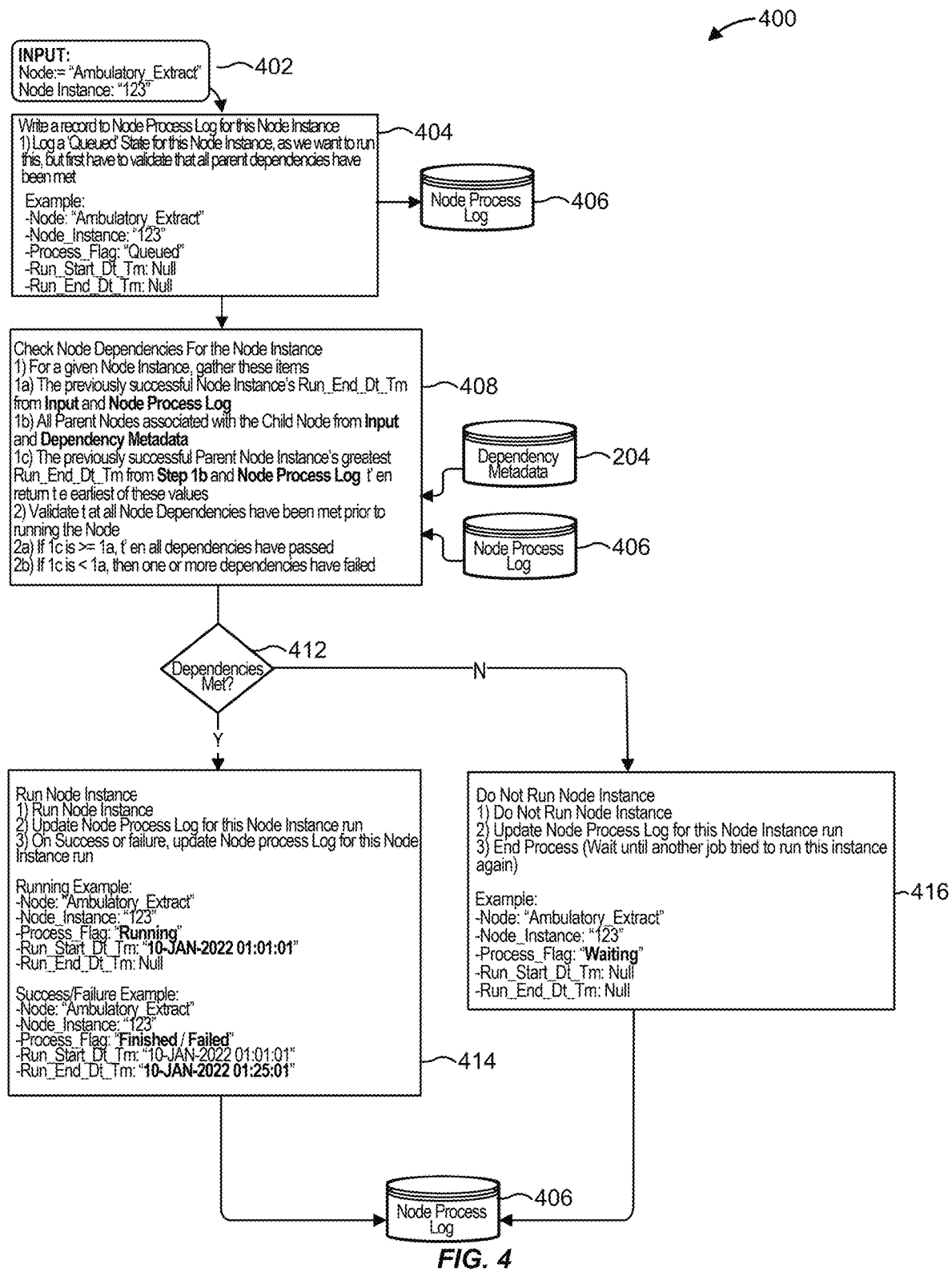
FIG. 4 illustrates a simplified block diagram for a process for traversing a dependency graph or tree structure according to certain aspects.

For example, in an exemplary logfile prior to going into block 408 for an input 402, as shown in FIG. 4, of Ambulatory_Extract can be as follows:

| Node_Instance | Node | Process_Flag | Run_Start | Run_End |
|---|---|---|---|---|
| 001 | Ambulatory_Extract | Finished | Jan. 1, 2023 3:30 | Jan. 1, 2023 3:40 |
| 002 | Encounter_Extract | Finished | Jan. 1, 2023 3:41 | Jan. 1, 2023 3:50 |
| 003 | Orders_Extract | Finished | Jan. 1, 2023 3:41 | Jan. 1, 2023 3:55 |
| 004 | Claims_Extract | Finished | Jan. 1, 2023 3:41 | Jan. 1, 2023 3:59 |
| 123 | Ambulatory_Extract | Queued | | |

For a specific example, at block 408 as shown in FIG. 4, process 400 can lookup from the node process log 406 the previously successful execution of the node "Ambulatory_Extract" given the current run's node instance of "123" and node of "Ambulatory_Extract". For the node instance "123", the previously successful execution of the node "Ambulatory_Extract" would be node instance "001" in this example, and the run_end_dt_tm for that node instance would be "Jan. 1 2023 3:40" from the node process log.

Continuing the specific example, the process 400 can access all parent nodes associated with the child node from input 402 and dependency metadata 204 as shown in FIG. 2. Per block 202 as shown in FIG. 2, the Parent_Nodes of "Ambulatory_Extract" are "Encounter_Extract", "Orders_Extract", and "Claims_Extract". The process 400 can access the previously successful parent node instance's greatest run_end_dt_tm and node process log 406 to return the earliest of these values. Looking at the greatest run_end_dt_tm of those previously successful parent nodes yields Node_Instances of 002, 003, and 004 respectively, and the corresponding run_end_dt_tms of "Jan 1 2023 3:50", "Jan 1 2023 3:55", and "Jan 1 2023 3:59". Returning the earliest of those values yields "Jan. 1 2023 3:50".

If there is an existing implementation which needs to be ported to this new methodology and the current stored dependency tree (e.g., dependency tree structure 100 as illustrated in FIG. 1) is not in a compatible structure as it currently exists, then process 400 can include performing a one-time process to create the flattened structure described in Step 1a. If the current dependency documentation needs to be kept as the source of truth, run this step as often as the source of truth is modified. This can allow a developer to port any current, incompatible documentation method into this new methodology.

If this is the first run ever for this process, and there is no previous Node Instance entry on the Node Process Log Table/File (when looking up the previously successful Node Instance's Run_End_Dt_Tm), return a past date (e.g., 1 Jan. 1800) to ensure the method will pass parent dependencies.

If there are no Parent Node dependencies for a Child Node (when looking up the previously successful parent node instance's greatest run_end_dt_tm), return the Current Date Time to ensure the method returns "all dependencies have passed".

Continuing the specific example, the earliest of the previously successful parent node instance's greatest run_end_dt_tm is "Jan 1 2023 3:50" and the previously successful node instance's run_end_dt_tm is "Jan. 1 2023 3:40". Since the previously successful parent node instance's greatest run_end_dt_tm of "Jan. 1 2023 3:50" is greater than or equal to the previously successful node instance's run_end_dt_tm of "Jan. 1 2023 3:40", all dependencies have passed.

FIG. 4 illustrates a simplified block diagram for a process 400 for traversing a dependency graph or tree structure according to certain aspects.

At block 402, process 400 can receive an input selected a first node instance. For example, the node can be "ambulatory_extract." The node instance can be "123." The first input can be received via an input via a keyboard, a keypad, a microphone, a chatbot, a touchscreen, and or one or more combinations of above.

At block 404, process 400 can write a record to the node process log 406 for this node instance. Initially, the log can indicate a "queued" state for this node instance because in order to execute this node, the system will need to validate that all parent dependencies have been met. For Example, the following metadata can be updated in the node process log 406: node: "ambulatory_extract"; node_instance: "123"; process_flag: "queued"; run_start_dt_tm (indicating a start date and time for a process): null; run_rnd_dt_tm: null.

At block 408, process 400 can check node dependencies for the node instance. For a given node instance, process 400 can access: the run_end_dt_tm from input and the node process log 406 for the previously successful execution of the node. The process 400 can access all parent nodes associated with the child node from input 402 and dependency metadata 204. The process 400 can access the previously successful parent node instance's greatest run_end_dt_tm and node process log 406 to return the earliest of these values. The process 400 can validate that all node dependencies have been met prior to running the node.

If the earliest of the previously successful parent node instance's greatest run_end_dt_tm (indicating a time and date of the end of the process run) and node process log is greater than or equal to the previously successful node instance's run_end_dt_tm from input 402 and node process log 406 then all dependencies have passed.

If the previously successful parent node instance's greatest run_end_dt_tm and node process log is less than the previously successful node instance's run_end_dt_tm from input 402 and node process log 406 then one or more dependencies have failed.

At block 412, process 400 can determine if all the dependencies for the parent nodes have been met or not.

At block 414, if all the dependencies have been met, the selected node instance can be executed. At the start of execution, the node process log 406 can be updated for the start of this execution of the node instance. At the start of the node process (e.g., a script program) being executed, the process 400 can update the node process log 406 for this node instance execution to include a date-time stamp and a status indicator. As an example, the following metadata can be stored in the node process log 406: node: "ambulatory_extract"; node_instance: "123"; process_flag: "running"; run_start_dt_tin: "10 Jan. 2022 01:01:01"; run_end_dt_tin: null.

After successful completion or failure of the execution of the node, the following metadata can be updated in the node process log 406: node: "ambulatory_extract"; node_instance: "123"; process_flag: "finished"/"failed"; run_start_dt_tm: "10 Jan. 2022 01:01:01"; run_end_dt_tm: "10 Jan. 2022 01:25:01".

At block 416, if one or more of the dependencies have not been completed that the process 400 will not run the node instance. The process 400 can update the node process log 406 for this node instance run. The process 400 will end and wait until another job tries to run this instance again.

As an example, process 400 can store the following metadata to the node process log 406: node: "ambulatory_extract"; node_instance: "123"; process flag: "waiting"; run_start_dt_tm: null; run_end_dt_tm: null.

The logic set that can be used to traverse the dependency graph or tree Structure to see if a node has passed all parent dependencies can include reading from two small metadata and log tables/files, and compare the results of two values returned, as described above. There is no complex logic utilizing recursion, repetitiveness, queues, stacks, etc. This logic can always give linear growth in run times and resources consumed as relating to the size and complexity of the dependency graph or tree Structure versus much faster growth from previous methods for large and complex implementations.

This is just an example of a given implementation, but this invention can be used on any dependency tree or directed acyclic graph structure regardless of project, complexity, size, or implementation details. This is a structured query language (SQL) based example, but the methodology holds true for any language or code base.

This specific implementation example assumes the following items in regard to the overall process and documentation in the node process log table/file. These assumptions are not required for this invention, however if these assumptions are not true, then the logic would need to be adjusted to account for the new assumptions. The node instance being run is the oldest/earliest Instance of that node still in a "queued" state. If a node is currently "queued," the process will not try to queue another instance of that node. If a node instance is currently "running" the process will wait until a "finished" or "failed" state prior to trying to run the next "queued" instance of the node. If the node process log table/file has a lot of historic data, add a filter to only look at most recent runs to make the process more efficient. An ideal implementation would have the implementation only store the more recent runs, with older, historic data being archived for audits, performance checks, etc. for audits, performance checks, etc.

Figure 5:
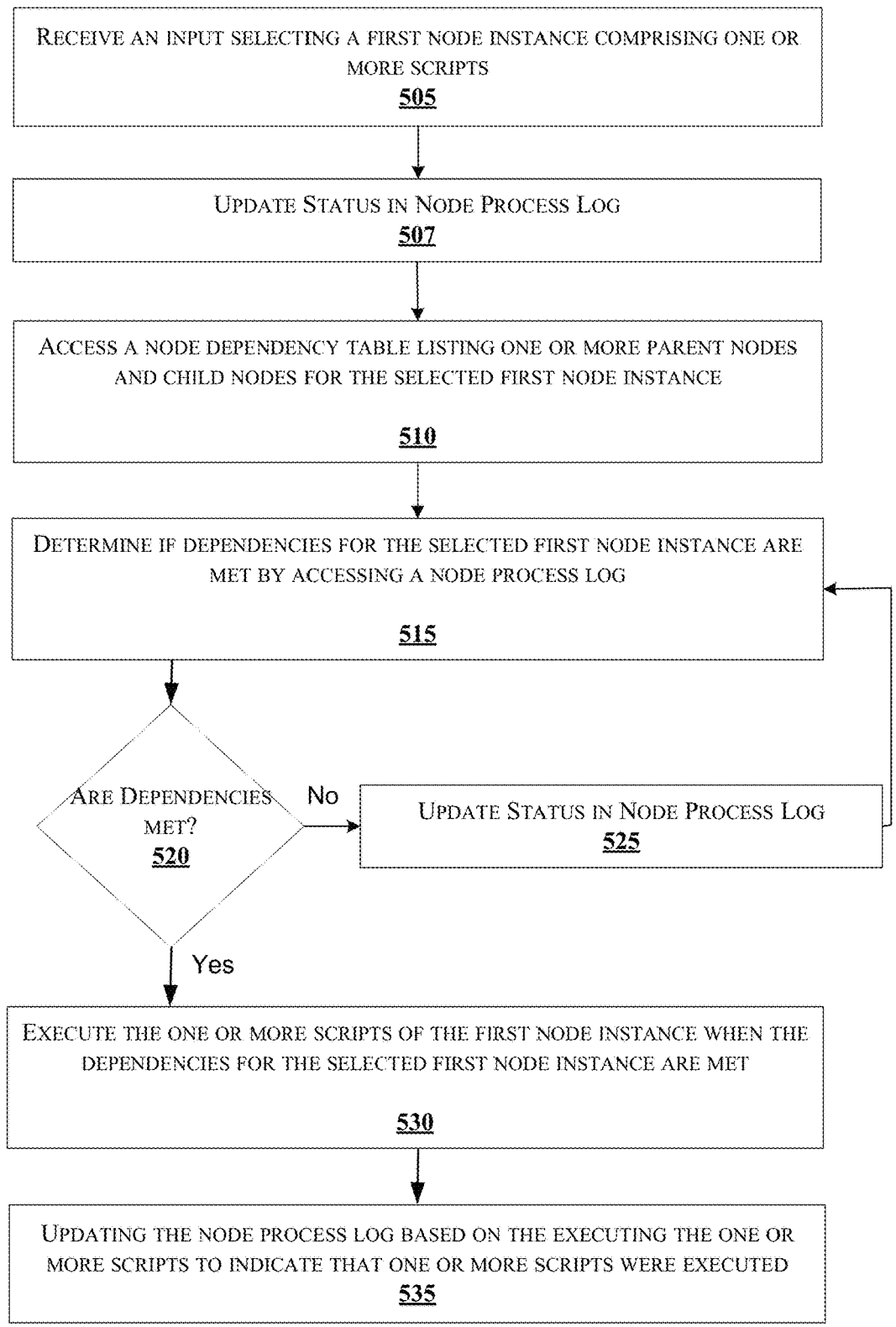
FIG. 5 illustrates a flow chart for a process for traversing a dependency graph or tree structure according to certain aspects.

FIG. 5 is a flow chart of a process 500 for traversing a dependency graph or tree structure in one step, according to an example of the present disclosure. According to an example, one or more process blocks of FIG. 5 may be performed by a computing device.

At block 505, process 500 may include receiving an input selecting a first node instance. The first node instance may include one or more scripts. For example, device may receive an input selecting a first node instance may include one or more scripts, as described above. At block 507, process 500 can include updating status in the node process log. In various embodiments, the status can be updated to "Queued."

At block 510, process 500 may include accessing a node dependency table listing one or more parent nodes and child nodes for the selected first node instance. For example, device may access a node dependency table listing one or more parent nodes and child nodes for the selected first node instance, as described above.

At block 515, process 500 may include determining if dependencies for the selected first node instance are met by accessing a node process log. For example, device may determine if dependencies for the selected first node instance are met by accessing a node process log, as described above.

At block 520, process 500 can determine if all dependencies have been met. This can be done by comparing the log entries with the dependency list. For each child_node all the parent_nodes must have been completed prior to execution of the child_node process.

At block 525, process 500 can update the status in the node process log even if all dependencies are not met. After updating the status in the node process log, process 500 can return to block 515.

At block 530, process 500 may include executing the one or more scripts of the first node instance when the dependencies for the selected first node instance are met. For example, device may execute the one or more scripts of the first node instance when the dependencies for the selected first node instance are met, as described above.

At block 535, process 500 may include updating the node process log based on the executing the one or more scripts. For example, device may update the node process log based on the executing the one or more scripts, as described above.

In various embodiments, the determining if dependencies for the selected first node instance are met by accessing a node process log can include accessing the node dependency table to determine a last successful execution for selected node instance. The process can include determining all parent nodes associated with a selected child node from the input and dependency metadata. The process can include determining the earlier of all previously selected parent node's latest instance execution time in the dependency metadata and a previous node time stored in the node process log. When the previously selected parent node instance execution time is greater than or equal to the last successful run time for the selected node instance, the process can include indicating that all the dependencies have passed. When the previously selected parent node instance execution time is less than the last successful execution time for the selected node instance, the process can include indicating that one or more of the dependencies have failed.

In various embodiments, the process 500 can include storing metadata for each instance in which one or more nodes are processed to a log file.

In various embodiments, the metadata comprises one or more of a name of the node, a way to identify execution of the node, a status indicator for the node, a start time stamp, and an end time stamp.

In various embodiments, the process 500 can include accessing dependency file to determine dependency structure. The process 500 can include storing dependency list having a child node field and a parent node field.

In various embodiments, for each child node a dependency list is stored as a single record. The dependency list can be a delimited list illustrating a relationship between a child node and one or more parent nodes.

In various embodiments, a dependency list is stored as a single record per distinct child node and parent node combination.

It should be noted that while FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
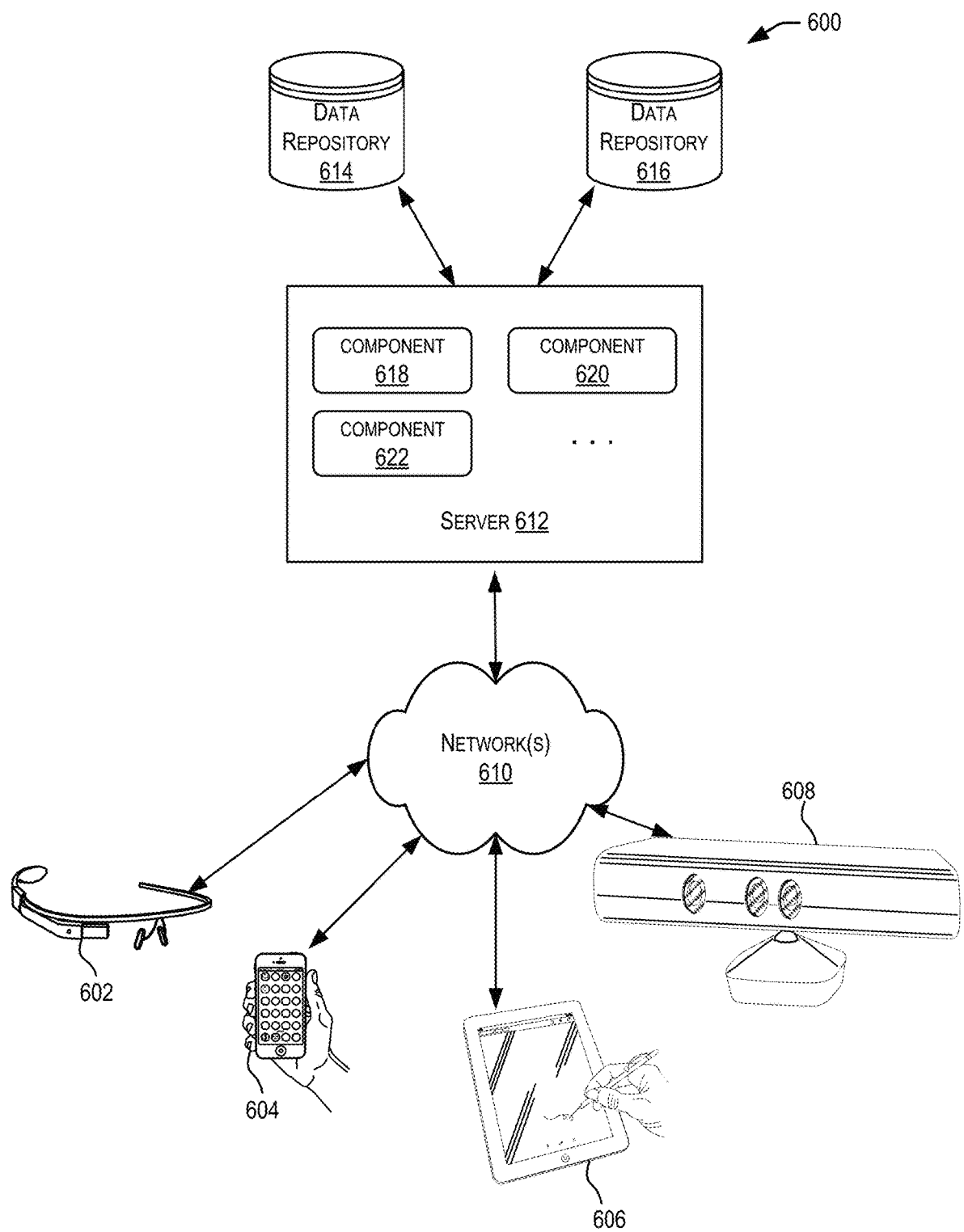
FIG. 6 depicts a simplified diagram of a distributed system for implementing certain aspects.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various aspects, server 612 may be adapted to run one or more services or software applications that enable techniques for handling long text for pre-trained language models.

In certain aspects, server 612 may also provide other services or software applications that can include non-virtual and virtual environments. In some aspects, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 for techniques for handling long text for pre-trained language models in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various aspects, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain aspects. For example, one or more of the data repositories 614, 616 may be used to store information for techniques for handling long text for pre-trained language models (e.g., intent score, overall score). Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain aspects, a data repository used by server 612 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 614, 616 may also be used by applications to store application data. The data repositories used by applications may be of different types such as, for example, a key-value store repository, an object store repository, or a general storage repository supported by a file system.

In certain aspects, the techniques for handling long text for pre-trained language models functionalities described in this disclosure may be offered as services via a cloud environment. FIG. 6 is a simplified block diagram of a cloud-based system environment in which various text handling-related services may be offered as cloud services, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 612. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

Figure 7:
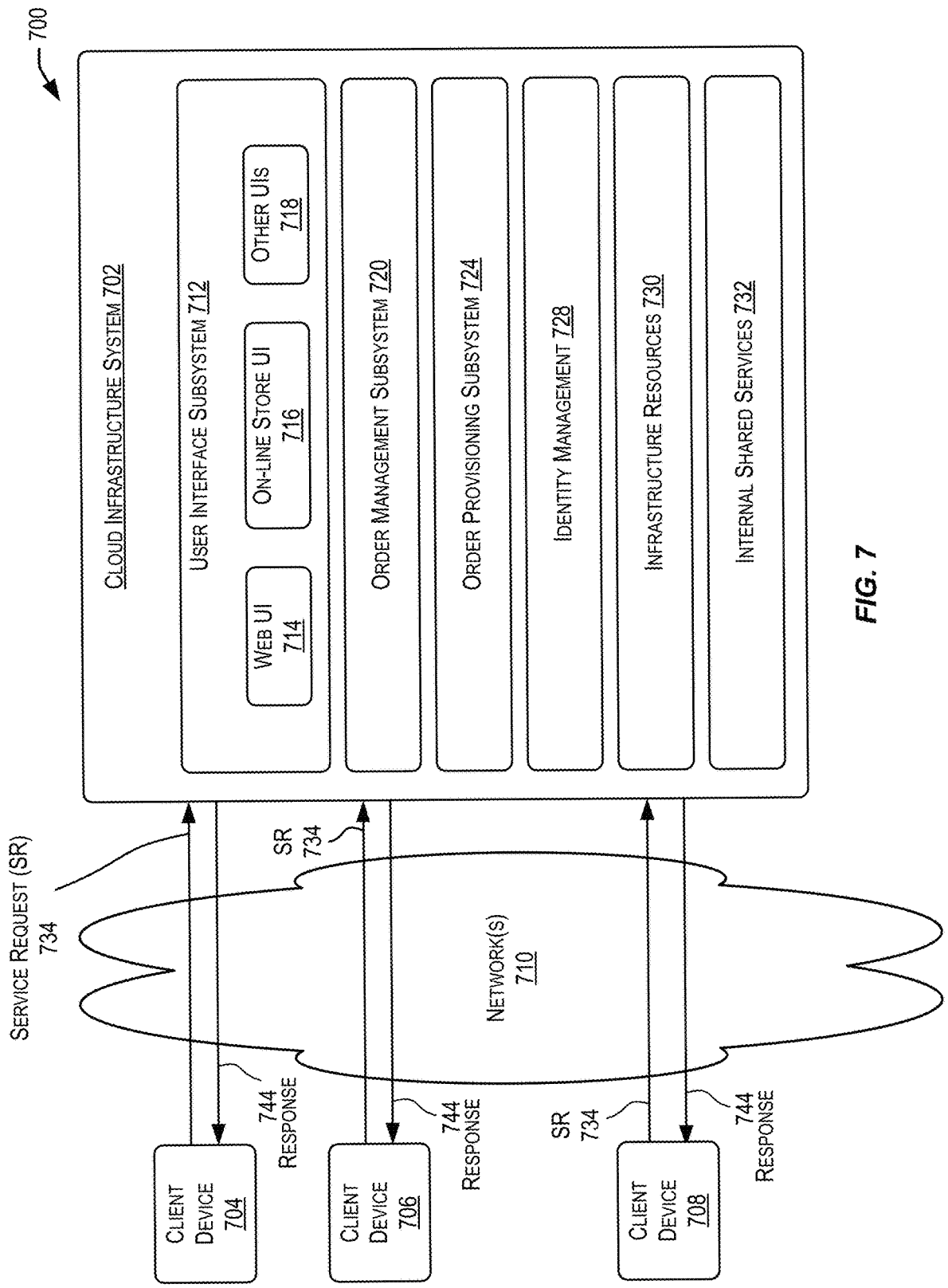
FIG. 7 is a simplified block diagram of one or more components of a system environment by which services provided by one or more components of an embodiment system may be offered as cloud services, in accordance with certain aspects.

The network environment 700 is an embodiment depicted in FIG. 7 can be one example of a cloud infrastructure system and is not intended to be limiting. It should be appreciated that, in some other aspects, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative aspects.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via a network 710 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other aspects, under a private cloud model, cloud infrastructure system 702 may be operated within an organization (e.g., within an enterprise organization) and services provided to customers that are within the organization. For example, the customers may be various departments of an enterprise such as the Human Resources department, the payroll department, etc. or even individuals within the enterprise. In certain other aspects, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request a chat bot service described in this disclosure.

In some aspects, the processing performed by cloud infrastructure system 702 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining the intent of an utterance. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain aspects, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a Chabot related service offered by cloud infrastructure system 702. As part of the order, the customer may provide information identifying for input (e.g., utterances).

In certain aspects, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain aspects, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
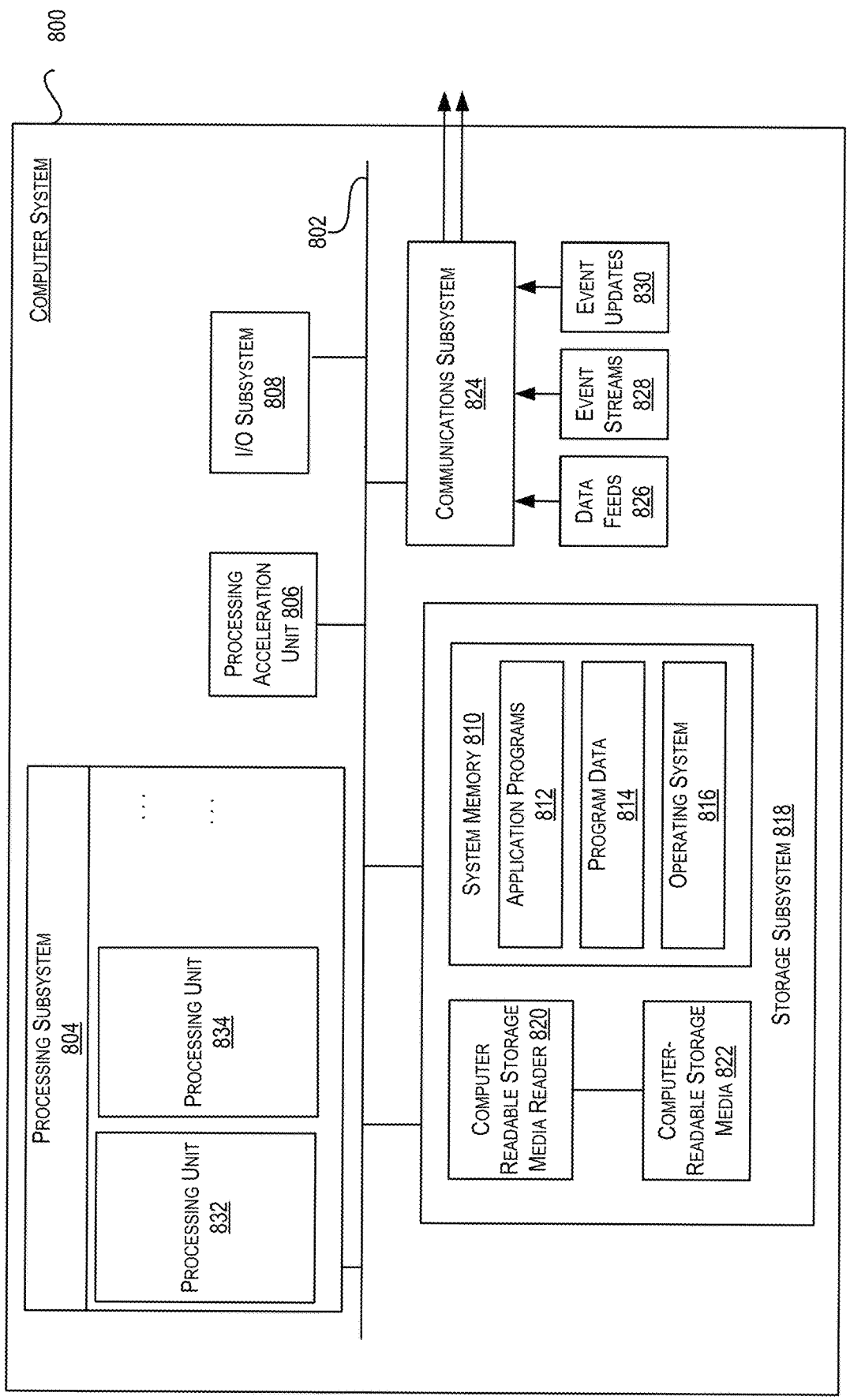
FIG. 8 illustrates an example computer system that may be used to implement certain aspects.

FIG. 8 illustrates an exemplary computer system 800 that may be used to implement certain aspects. For example, in some aspects, computer system 800 may be used to implement any of the process 500 for traversing a dependency graph in one step in FIG. 5 and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some aspects, processing subsystem 804 can include one or more special purpose co-processors such as graphics processors, digital signal processors (DSPs), or the like. In some aspects, some or all of the processing units of processing subsystem 804 can be implemented using customized circuits, such as application specific integrated circuits (ASICs), or field programmable gate arrays (FPGAs).

In some aspects, the processing units in processing subsystem 804 can execute instructions stored in system memory 810 or on computer readable storage media 822. In various aspects, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain aspects, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some aspects. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

Byway of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® Operating System (OS), and the like) and/or mobile operating systems such as iOS, Windows® Phone, Android® OS, BlackBerry® OS, Palm® OS operating systems, and others.

Computer-readable storage media 822 may store programming and data constructs that provide the functionality of some aspects. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, digital video disc (DVD), a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 818 may also include a computer-readable storage media reader 820 that can further be connected to computer-readable storage media 822. Reader 820 may receive and be configured to read data from a memory device such as a disk, a flash drive, etc.

In certain aspects, computer system 800 may support virtualization technologies, including but not limited to virtualization of processing and memory resources. For example, computer system 800 may provide support for executing one or more virtual machines. In certain aspects, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to transmit a response to a user regarding the inquiry for a Chabot.

Communication subsystem 824 may support both wired and/or wireless communication protocols. For example, in certain aspects, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 824 can provide wired network connectivity (e.g., Ethernet) in addition to or instead of a wireless interface.

Communication subsystem 824 can receive and transmit data in various forms. For example, in some aspects, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects will provide those skilled in the art with an enabling description for implementing various aspects. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method performed by one or more processors of a computing device, the method comprising:
   executing a computerized process by traversing a dependency graph comprising a plurality of nodes, wherein traversing the dependency graph comprises:
   (i) receiving an input selecting a first node instance of the plurality of nodes, the first node instance comprising one or more scripts;
   (ii) updating a status for the first node instance in a node process log;
   (ii) accessing a node dependency table, the node dependency table listing parent nodes for the first node instance, the parent nodes being included in the plurality of nodes, wherein the parent nodes serve as dependencies for the first node instance;
(iii) determining whether the dependencies for the first node instance have been met;
(iv) in response to determining that the dependencies for the first node instance have not been met, updating the status for the first node instance and returning to step (iii);
(v) in response to determining that the dependencies for the first node instance have been met, executing the one or more scripts of the first node instance; and
(vi) updating the status for the first node instance to indicate that the one or more scripts were executed.

2. The method of claim 1, wherein the determining whether the dependencies for the first node instance have been met comprises:
accessing the node dependency table to determine a last successful execution for a selected node instance;
determining all parent nodes associated with a selected child node from the input and dependency metadata;
determining the earlier of a previously selected parent node instance execution time in the dependency metadata and a previous node time stored in the node process log;
when the previously selected parent node instance execution time is greater than or equal to the last successful execution time for the selected node instance, indicating that all the dependencies have passed; and
when the previously selected parent node instance execution time is less than the last successful execution time for the selected node instance, indicating that one or more of the dependencies have failed.

3. The method of claim 1, further comprising:
storing metadata for each instance in which one or more nodes are processed to a log file.

4. The method of claim 3, wherein the metadata comprises one or more of a name of a node, a way to identify execution of the node, a status indicator for the node, a start time stamp, and an end time stamp.

5. The method of claim 1, further comprising:
accessing a dependency file to determine dependency structure; and
storing a dependency list having a child node field and a parent node field.

6. The method of claim 5, wherein for each child node a dependency list is stored as a single record.

7. The method of claim 5, wherein a dependency list is stored as a single record per distinct child node and parent node combination.

8. A system comprising:
one or more processors; and
a memory coupled to the one or more processors, the memory storing a plurality of instructions executable by the one or more processors, the plurality of instructions that when executed by the one or more processors perform operations comprising:
executing a computerized process by traversing a dependency graph comprising a plurality of nodes, wherein traversing the dependency graph comprises:
(i) receiving an input selecting a first node instance of the plurality of nodes, the first node instance comprising one or more scripts;
(ii) updating a status for the first node instance in a node process log;
(ii) accessing a node dependency table listing parent nodes for the first node instance, the parent nodes being included in the plurality of nodes, wherein the parent nodes serve as dependencies for the first node instance;
(iii) determining whether the dependencies for the first node instance have been met;
(iv) in response to determining that the dependencies for the first node instance have not been met, updating the status for the first node instance and returning to step (iii);
(v) in response to determining that the dependencies for the first node instance have been met, executing the one or more scripts of the first node instance; and
(vi) updating the status for the first node instance to indicate that the one or more scripts were executed.

9. The system of claim 8, wherein the determining whether the dependencies for the first node instance have been met comprises:
accessing the node dependency table to determine a last successful execution for a selected node instance;
determining all parent nodes associated with a selected child node from the input and dependency metadata;
determining the earlier of a previously selected parent node instance execution time in the dependency metadata and a previous node time stored in the node process log;
when the previously selected parent node instance execution time is greater than or equal to the last successful execution time for the selected node instance, indicating that all the dependencies have passed; and
when the previously selected parent node instance execution time is less than the last successful execution time for the selected node instance, indicating that one or more of the dependencies have failed.

10. The system of claim 8, further comprising:
storing metadata for each instance in which one or more nodes are processed to a log file.

11. The system of claim 10, wherein the metadata comprises one or more of a name of a node, a way to identify execution of the node, a status indicator for the node, a start time stamp, and an end time stamp.

12. The system of claim 8, wherein the operations further comprise:
accessing a dependency file to determine dependency structure; and
storing a dependency list having a child node field and a parent node field.

13. The system of claim 12, for each child node a dependency list is stored as a single record.

14. The system of claim 12, wherein a dependency list is stored as a single record per distinct child node and parent node combination.

15. A non-transitory computer-readable medium storing a plurality of instructions executable by one or more processors that cause the one or more processors to perform operations comprising:
executing a computerized process by traversing a dependency graph comprising a plurality of nodes, wherein traversing the dependency graph comprises:
(i) receiving an input selecting a first node instance of the plurality of nodes, the first node instance comprising one or more scripts;
(ii) updating a status for the first node instance in a node process log;
(ii) accessing a node dependency table listing parent nodes for the first node instance, the parent nodes being included in the plurality of nodes, wherein the parent nodes serve as dependencies for the first node instance;
(iii) determining whether the dependencies for the first node instance have been met;
(iv) in response to determining that the dependencies for the first node instance have not been met, updating the status for the first node instance and returning to step (iii);
(v) in response to determining that the dependencies for the first node instance have been met, executing the one or more scripts of the first node instance; and
(vi) updating the status for the first node instance to indicate that the one or more scripts were executed.

16. The non-transitory computer-readable medium of claim 15, wherein the determining whether the dependencies for the first node instance have been met comprises:
accessing the node dependency table to determine a last successful execution for a selected node instance;
determining all parent nodes associated with a selected child node from the input and dependency metadata;
determining the earlier of a previously selected parent node instance execution time in the dependency metadata and a previous node time stored in the node process log;
when the previously selected parent node instance execution time is greater than or equal to the last successful execution time for the selected node instance, indicating that all the dependencies have passed; and
when the previously selected parent node instance execution time is less than the last successful execution time for the selected node instance, indicating that one or more of the dependencies have failed.

17. The non-transitory computer-readable medium of claim 15, wherein the operations further comprise:
storing metadata for each instance in which one or more nodes are processed to a log file.

18. The non-transitory computer-readable medium of claim 17, wherein the metadata comprises one or more of a name of a node, a way to identify execution of the node, a status indicator for the node, a start time stamp, and an end time stamp.

19. The non-transitory computer-readable medium of claim 15, wherein the operations further comprise:
accessing a dependency file to determine dependency structure; and
storing a dependency list having a child node field and a parent node field.

20. The non-transitory computer-readable medium of claim 15, wherein for each child node a dependency list is stored as a single record.

* * * * *

UNITED STATES PATENT AND TRADEMARK OFFICE
CERTIFICATE OF CORRECTION

PATENT NO. : 12,306,821 B2
APPLICATION NO. : 18/130419
DATED : May 20, 2025
INVENTOR(S) : Bush Page 1 of 2

It is certified that error appears in the above-identified patent and that said Letters Patent is hereby corrected as shown below:

On the Title Page

Column 1, under item (73) assignee, Line 2, delete "Shores (CA)" and insert -- Shores, CA (US) --, therefor.

In the Specification

In Column 8, Line 52, delete "and or" and insert -- and/or --, therefor.

In Column 8, Line 62, delete "run_rnd_dt_tm:" and insert -- run_end_dt_tm: --, therefor.

In Column 9, Line 30, delete "run_start_dt_tin:" and insert -- run_start_dt_tm: --, therefor.

In Column 9, Line 30, delete "run_end_dt_tin:" and insert -- run_end_dt_tm: --, therefor.

In Column 19, Line 66, delete "Byway" and insert -- By way --, therefor.

In Column 20, Line 25, delete "CD ROM," and insert -- CD-ROM, --, therefor.

In the Claims

In Column 22, Line 66, in Claim 1, delete "(ii)" and insert -- (iii) --, therefor.

In Column 23, Line 4, in Claim 1, delete "(iii)" and insert -- (iv) --, therefor.

In Column 23, Line 6, in Claim 1, delete "(iv)" and insert -- (v) --, therefor.

In Column 23, Line 10, in Claim 1, delete "(v)" and insert -- (vi) --, therefor.

Signed and Sealed this
Twelfth Day of August, 2025

Coke Morgan Stewart
*Acting Director of the United States Patent and Trademark Office*

CERTIFICATE OF CORRECTION (continued)
U.S. Pat. No. 12,306,821 B2

In Column 23, Line 13, in Claim 1, delete "(vi)" and insert -- (vii) --, therefor.

In Column 23, Line 66, in Claim 8, delete "(ii)" and insert -- (iii) --, therefor.

In Column 24, Line 4, in Claim 8, delete "(iii)" and insert -- (iv) --, therefor.

In Column 24, Line 6, in Claim 8, delete "(iv)" and insert -- (v) --, therefor.

In Column 24, Line 10, in Claim 8, delete "(v)" and insert -- (vi) --, therefor.

In Column 24, Line 13, in Claim 8, delete "(vi)" and insert -- (vii) --, therefor.

In Column 24, Line 66, in Claim 15, delete "(ii)" and insert -- (iii) --, therefor.

In Column 25, Line 4, in Claim 15, delete "(iii)" and insert -- (iv) --, therefor.

In Column 25, Line 6, in Claim 15, delete "(iv)" and insert -- (v) --, therefor.

In Column 25, Line 10, in Claim 15, delete "(v)" and insert -- (vi) --, therefor.

In Column 25, Line 13, in Claim 15, delete "(vi)" and insert -- (vii) --, therefor.